UNITED STATES PATENT OFFICE.

ANSIL MOFFATT, OF INDIANAPOLIS, INDIANA, ASSIGNOR TO THE AZOTE POWDER COMPANY, OF SAME PLACE.

PROCESS OF MAKING NITRO-EXPLOSIVES.

SPECIFICATION forming part of Letters Patent No. 627,436, dated June 20, 1899.

Application filed September 29, 1898. Serial No. 692,216. (No specimens.)

*To all whom it may concern:*

Be it known that I, ANSIL MOFFATT, a citizen of the United States, residing at Indianapolis, in the county of Marion and State of Indiana, have invented certain new and useful Improvements in Processes of Making Nitro Explosives, of which the following is a specification.

My invention relates to that class of explosives known as "nitro compounds," such compounds being bodies in which hydrogen is replaced by $NO_2$, or, as sometimes understood, in which hydroxyl (HO) is replaced by $NO_3$. The particular class of bodies in which I find the base for my explosive is that class known in chemistry as "carbohydrates." Heretofore in the manufacture of carbohydrate nitro compounds it has been customary to take cotton fiber, paper or wood pulp, or other forms of cellulose or cellulose-related bodies and submit them after careful purification to the action of nitric acid or mixed nitric and sulphuric acid, whereby these cellulose bodies were converted into nitro compounds. The excess of acid was washed away and the operation variously completed. In my preferred way of manufacture I take starch (preferably that of maize) and without any purification I submit this to a temperature exceeding 100° centigrade, but not exceeding 140° centigrade, whereby the moisture is driven off. Then I put this dried starch while hot into closed containers and allow to cool or cause to cool to below 4° centigrade. I then prepare a bath of nitric acid and sulphuric acid, as follows: I take one volume of nitric acid of as near to 1.50 specific gravity as I can procure and mix with this two volumes of sulphuric acid, specific gravity 1.84, cool the mixture to below 4° centigrade in a suitable cooling apparatus, and with each liter of this acid bath I mix two hundred grams of the dried starch, previously cooled to below 4° centigrade, I allow to thoroughly mix, and allow the mixture to react for a few minutes or longer, if expedient. I then pour the mixture onto broken ice, using about two pounds of ice for each pound of sulphuric acid represented. The temperature of the diluted mixture of acid, nitro-starch, and melted ice will fall to −4° centigrade or −6° centigrade, and no local or general heating will occur. The mixing should be accomplished by continuous stirring. The separation of the nitro-starch from the surplus acids may now be accomplished by gravity or centrifugal action. The nitro compound settles to a mass, with water adhering, of a specific gravity of 1.30. The original acid mixture had a specific gravity of about 1.75. The actual specific gravity of the dried nitro-starch is about 1.69, but when suspended in aqueous liquids of inferior density it settles to a stiff mass of specific gravity about 1.30 and will not settle if the specific gravity of the aqueous liquid equals or exceeds that of the mass. For this reason I use sufficient water to reduce the gravity of the acid residue to below 1.30, and in the above-mentioned procedure it will be seen that the nitro-starch will settle readily by gravity or centrifugal action. I separate it in either manner and save the residue or surplus acids for future recovery or use. The nitro-starch is then washed a time or two to remove the excess of acid. Then more water is added, and soda-ash of a quantity sufficient to produce a slight alkaline reaction is introduced, said soda-ash usually equaling in weight one to two per cent. the weight of the compound, and the alkalized mixture is then vigorously boiled in a suitable vessel. The boiling need not exceed more than ten minutes in time, and the purpose of boiling in the alkalized medium is to remove impurities, which interfere with the explosive qualities and impair the stability of the new explosive. The nitro-starch is now a rapidly-settling powder of remarkable tenacity and coherence and admits of washing, draining, &c., with great ease. The boiling process and washing are repeated until all soluble matters are practically eliminated, and then the nitro-starch is dried, which completes the process of manufacture.

Inasmuch as nitric acid of specific gravity of 1.50, or thereabout, is not always procurable, not permitted by transportation companies to be shipped in large quantities, and also sometimes for economical reasons, it may be necessary or expedient to modify the acid bath used in the manufacture of this explosive. I can do this without varying my general process. It is well known that the office of the sulphuric acid in this bath is to absorb any water that may be present in the nitric acid or which is set free in the reaction between the starch and nitric acid. I may therefore use nitric acid of specific gravity of about 1.42, containing about seventy per cent. of anhydrous acid, by increasing the proportion of sulphuric acid. I use, therefore, with nitric acid of specific gravity of 1.42, or thereabout, five volumes of sulphuric acid of specific gravity 1.84 to each volume of nitric acid of specific gravity 1.42 and use about seventy grams of dried starch to each liter of the mixture, or I may use nitrate of potassium or sodium as the source of the nitric radical and make my bath of either salt dissolved in sulphuric acid. In this case I take one pound of $KNO_3$ to six pounds of sulphuric acid or one pound of $NaNO_3$ to seven pounds of sulphuric acid and use seventy to eighty grams of starch to each liter of the mixture. The general process of nitration is the same as with the stronger nitric acid as to temperature, dryness of the starch, and dilution with water or ice.

Instead of diluting the mixture after nitration is accomplished with ice, I may have a container surrounded by a freezing mixture or agent, such as is used in manufacture of artificial ice, and into this put the proper quantity of water and then add the mixture of acids and nitro-starch at such a rate that the temperature will not rise above 4° centigrade or to the point which invites dangerous chemical action. Such variations of the process as above stated are readily seen to be tantamount to each other.

I am aware that nitro compounds of carbohydrates and even of starch itself have been made heretofore and that the manufactures of nitro-cotton and nitrated wood-pulp are established industries; but all past authorities agree that nitro-starch as heretofore made is an exceedingly unstable compound, subject to spontaneous chemical alteration and too feeble for a practical explosive. The cause of this acknowledged instability and general unsatisfactory character is to be found in the processes heretofore used. The usual process has been to dissolve starch in strongest nitric acid to disintegrate the starch granules and precipitate the solution with water. Even when the action of the nitric acid has been supplemented by sulphuric acid the character of the product is essentially the same as that of the product of strong nitric acid alone by processes heretofore used. The resulting nitro compound contains a less and more variable proportion of $NO_2$ and is of a horny and impenetrable character, difficult or impracticable to wash, and free from acids and unallowable impurities, and hence unstable. Moreover, the distinct and individual character of the original starch granules is destroyed, and the microscope reveals irregular fragments or flocculi of the compound. But my process is unaccompanied by any solution of the starch or nitro-starch, which latter retains the granular form of the original starch, and no disintegration of any granules results from the production of nitro-starch by the process to which I lay claim. Starch as it occurs in nature is in the form of more or less rounded or angular granules, visible under the microscope. These granules are composed of an inner substance called "granulose" and an outer envelop called "amylo-cellulose." This envelop is easily ruptured by heat or chemical agents. The production of a stable and satisfactory explosive depends, as I have discovered, upon the maintenance of the integrity of these starch granules and the continuity of this envelop. Starch retains at common temperature some ten to fifteen per cent. of moisture, which may be driven away by exposure to a temperature of 100° centigrade or above, as before stated. This moisture must be dried out before nitration for reasons which I will now disclose. Even after drying water is assimilated during the process of nitration, as indicated by the following equation:

$$C_6H_{10}O_5 + 3HNO_3 = C_6H_7(NO_3)_3O_2 + 3H_2O,$$

and it is to absorb this water and facilitate its assimilation that sulphuric acid is used. It is, as far as now known, the only body capable of absorbing water which is at the same time compatible with a nitrating-bath. The absorption of this water by sulphuric acid is attended with generation of heat. All of these facts are well known to chemists and form part of the literature of chemistry. I have discovered that sulphuric acid in acting as an absorbent of this water, elimated by the reaction shown, only generates heat to the extent possible by its combination with water to the point of greatest physical condensation, answering to the chemical formula $$H_2SO_4, 2H_2O,$$

and beyond this point its action is uncertain and not productive of a stable explosive. Now in this reaction, to which sulphuric acid is accessory, the equation is $$2C_6H_{10}O_5 + 6HNO_3 + 3H_2SO_4 \\ = 2C_6H_7(NO_3)_3O_2 + 3(H_2SO_4, 2H_2O.$$

In practice the sulphuric and nitric acids are mixed separately from the starch and allowed to cool. The heat reaction between the starch and mixed acids is therefore due alone to the assimilation of water from the starch and its combination with the sulphuric acid.

In chemical works the combination of a molecule of $H_2SO_4$ with two molecules of water is stated to be attended with the generation of nine thousand seven hundred and fifty-six heat units. The above equation, into which three molecules of $H_2SO_4$ and six molecules of water enter, therefore generates three times the heat or twenty-nine thousand two hundred and sixty-eight heat units. The bodies entering into the reaction are, as stated above, three hundred and twenty-four parts of starch with a specific heat of .53, three hundred and seventy-eight parts of $HNO_3$ with specific heat of .375, and two hundred and ninety-four parts of $H_2SO_4$ with specific heat of .343, and it is readily seen that the reacting bodies are equivalent in absorption of heat to four hundred and fourteen parts of water. Hence the rise of temperature, aside from decomposition, would be according to calculation 70° centigrade. Inasmuch as this rise of temperature would result in the destruction of the reacting bodies and would be uncontrollable in practice, I have devised the process of diluting the mixture of sulphuric and nitric acids, so as to give a calculated rise of temperature of not over 20° centigrade, which practice has shown me is fully under control by refrigerating mixtures, and, moreover, I may reduce my reacting agents to − 16° centigrade without freezing them to a solid mass, and then the rise of temperature will not carry the reacting materials to beyond 4° centigrade, which I regard as the critical temperature for starch. In practical manufacture I accomplish the dilution by the general rule, as follows:

First. An excess of nitric acid is necessary for a high nitration. I find in practice that twice the theoretical quantity is sufficient. Therefore I invariably double the calculated quantity of nitric acid.

Second. Sulphuric acid, aside from its office of assimilating the water set free in the reaction between the starch and the nitric acid, is practically the only available diluting agent for the following reasons: Nitric acid itself, when used in large excess, tends to dissolve and disrupt the granules of the starch. As before stated, disruption of the granule causes instability of the product and is hence objectionable. Sulphuric acid not only does not dissolve or disrupt the granules, but prevents the nitric acid from so doing. Hence it is perfectly available as a diluting agent.

Calculation shows that with a given quantity of dry starch double the theoretical quantity of nitric acid and six times the theoretical quantity of sulphuric acid will give a rise of temperature of 20° centigrade or less. Hence a bath made according to this understanding will be a practical bath. With heat generation of twenty-nine thousand two hundred and sixty-eight heat units based on three hundred and twenty-four parts of starch ($2C_6H_{10}O_5$) this ratio of starch, nitric acid, and sulphuric acid is equivalent to about fifteen hundred parts of water. Hence equal to a rise of somewhat less than 20° centigrade in actual temperature. This rise is under perfect control by common frigerific appliances and permits a nitration to be made without a rise of temperature to above 4° centigrade, as already specified. The rise of 20° in temperature here mentioned must not be confused with a registered temperature of 20° centigrade, since the latter would be fatal to the nitro compound. The actual rise in temperature in the bath during nitration must not be to above 4° centigrade, which I have discovered is the danger-point in practical manufacture, as beyond this the granules will begin to disrupt, resulting in an unstable product. In practice the temperature of the bath can be reduced to a point where the rise in reaction will not carry it above said point. For instance, the bath being reduced to a temperature of − 16° centigrade the addition of the starch would cause a rise of about 20° in the temperature, which would bring the bath to about 4° centigrade actual temperature. Instead of reducing the temperature of the bath to − 16° centigrade, however, the same result can be accomplished by reducing it to below the danger-point and surrounding the nitrating-jars with a frigerific agent capable of absorbing the rising heat, so that the actual temperature will not rise to above said danger-point.

Having thus fully described my said invention, what I claim as new, and desire to secure by Letters Patent, is—

1. The process of producing nitrate of starch which consists in eliminating the moisture from the starch and subjecting it to a nitrating-bath at a temperature below the point where the heat caused by the reaction will rupture the starch granules, whereby the product consists of granules of the same physical form as the original starch granules, and its stability thereby insured, substantially as set forth.

2. The process of producing nitrate of starch which consists in removing the moisture from the starch by dry heat, reducing its temperature to below the point where its granules will rupture in the nitrating-bath, mixing said starch into said nitrating-bath made and maintained during the operation at a temperature below said point, and then purifying and drying the same, whereby the product consists of unruptured granules, and its stability thus insured, substantially as set forth.

3. The process of making a stable nitrate of starch consisting in removing the moisture from the starch, then cooling the starch, and then treating said dried and cooled starch in a nitrating-bath at such temperature where rupture of the starch granules will not occur during nitration, substantially as set forth.

4. The process of producing nitrate of starch consisting in submitting dried starch to the action of a nitrating-bath at or below 4° centigrade, diluting the mixture with water sufficient to lower its specific gravity to below 1.30, washing, neutralizing and drying the product, substantially as set forth.

5. The process of producing nitrate of starch consisting in drying the starch until practically free from moisture, cooling the same in closed vessels, mixing the same into a nitrating-bath of a temperature maintained during the operation below 4° centigrade, allowing the starch to macerate, then diluting the bath to not over 1.30 specific gravity, then washing, neutralizing and drying the nitro-starch product, substantially as set forth.

6. The process of producing nitrate of starch consisting in drying the starch until free from moisture as nearly as may be, placing the dried starch while hot in closed vessels, reducing its temperature in said vessels to below 4° centigrade, preparing a bath of nitric and sulphuric acids, reducing its temperature to below 4° centigrade, mixing said dried starch into said bath while maintaining its temperature below 4° centigrade, permitting the starch to thoroughly macerate, diluting the mixture into ice or water in a refrigerating apparatus so that the heat caused by the reaction between the acid and water shall not cause the temperature to rise above 4° centigrade, and proportioning the water or ice so that the diluted acids shall not exceed 1.30 in specific gravity, removing the diluted acids by subsidence of the nitro-starch and decantation of the acids, washing the greater portion of the acids from the nitro-starch, then boiling the nitro-starch with an alkaline lye sufficient to maintain a distinct alkaline reaction, until soluble matters are dissolved, washing the nitro-starch with water until soluble matter is practically eliminated, and finally drying into the finished product, substantially as set forth.

In witness whereof I have hereunto set my hand and seal, at Indianapolis, Indiana, this 26th day of September, A. D. 1898.

ANSIL MOFFATT. [L. S.]

Witnesses:
JOSEPH A. MINTURN,
CARL SCHLEGEL.